(12) United States Patent
Huang

(10) Patent No.: US 7,675,202 B1
(45) Date of Patent: Mar. 9, 2010

(54) ISOTROPIC RING MAGNET LINEAR VOICE COIL MOTOR

(76) Inventor: Benjamin Huang, 100 S. Milpitas Blvd., Milpitas, CA (US) 95035

( * ) Notice: Subject to any disclaimer, the term of this patent is extended or adjusted under 35 U.S.C. 154(b) by 55 days.

(21) Appl. No.: 11/879,881

(22) Filed: Jul. 18, 2007

(51) Int. Cl.
*H02K 41/00* (2006.01)

(52) U.S. Cl. .......................................... 310/13; 335/222

(58) Field of Classification Search .................. 310/13, 310/14; 335/222, 223
See application file for complete search history.

(56) References Cited

U.S. PATENT DOCUMENTS

| RE23,856 E | 8/1954 | Smith | |
|---|---|---|---|
| 3,740,594 A | 6/1973 | Casey | |
| 4,236,130 A * | 11/1980 | Hubert | 335/223 |
| 4,414,594 A | 11/1983 | Farmer et al. | |
| 4,415,941 A | 11/1983 | Gibeau et al. | |
| 4,462,054 A | 7/1984 | Dong et al. | |
| 4,603,270 A * | 7/1986 | Van Davelaar | 310/13 |
| 4,669,013 A * | 5/1987 | Scranton et al. | 360/266.9 |
| 4,703,297 A * | 10/1987 | Nagasaka | 335/222 |
| 4,808,955 A * | 2/1989 | Godkin et al. | 335/222 |
| 4,888,506 A * | 12/1989 | Umehara et al. | 310/13 |
| 4,960,474 A | 10/1990 | Nozawa et al. | |
| 5,345,206 A * | 9/1994 | Morcos | 335/222 |
| 5,420,468 A * | 5/1995 | Mody | 310/13 |
| 5,598,625 A | 2/1997 | Bluen et al. | |
| 5,600,189 A * | 2/1997 | Van Geel et al. | 310/40 R |
| 5,604,390 A | 2/1997 | Ackermann | |
| 5,808,381 A * | 9/1998 | Aoyama et al. | 310/12 |
| 6,770,242 B2 | 8/2004 | Billiet et al. | |
| 2002/0197179 A1 * | 12/2002 | Billiet et al. | 419/10 |

* cited by examiner

*Primary Examiner*—Hae Moon Hyeon
(74) *Attorney, Agent, or Firm*—Law Office of Karen Dana Oster, LLC

(57) ABSTRACT

A linear voice coil motor having a radially magnetized magnet structure. The voice coil motor includes an outer yoke an inner yoke magnetically coupled with and extending inside of the outer yoke. An air gap defined between the outer yoke and the inner yoke. A voice coil assembly is mounted so as to enable movement between the voice coil assembly and at least one of the yokes. In one embodiment the magnet structure is an isotropic magnet structure. In one embodiment the magnet structure is formed by a plurality of ring magnets. In one embodiment the magnet structure is formed by a plurality of isotropic ring magnets.

24 Claims, 8 Drawing Sheets

ISOTROPIC RING MAGNET LINEAR VOICE COIL MOTOR

BACKGROUND OF INVENTION

The present invention relates to linear voice coil motors. In particular, the present invention relates to such a motor using a construction that enables use of the motor in environments demanding superior performance at a low relative cost.

A linear voice coil motor is an electromagnetic device in which a voice coil assembly supported on one motor part is excited by a current so as to cause interaction with a magnetic flux emanating from another motor part, thereby creating a force between the two motor parts in a direction normal to the current and flux. The two motor parts are configured to permit limited linear displacement (or other movement) therebetween in reaction to the force. By periodically reversing the direction of current flow, reciprocating movement between the parts can be obtained. In practical applications, typically one motor part is held stationary while the other motor part drives or actuates various devices that require rapid and accurate positioning. Exemplary practical applications include a voice cone of a speaker and the transducer arms of a magnetic disk drive.

Key characteristics of linear voice coil motors include linearity, maximum force, driving efficiency, and durability. In respect to linearity, for positional accuracy and smooth and efficient operation, it is desirable that the displacement force between the motor parts be nearly linearly proportional to the instantaneous coil current throughout the length of the stroke (the total travel between the two ends of a voice coil motor). The ratio of the displacement force to coil current is referred to as the "force constant." A motor exhibiting a displacement force that varies linearly with coil current will have an unvarying force constant over the length of the stroke. Non-uniformities in the magnetic field along the stroke can degrade the linearity performance of the motor.

In one typical but demanding environment, the linear voice coil motor is used to drive the transducer arms of the disc drive of a portable computer. Here it is desirable that the voice motor exhibit high linearity so that the transducer head can be accurately positioned relative to the disc for reading or writing particular data. At the same time, it is desirable that the motor generate a high stroke force for a given drive current to permit rapid access to various data sectors in a manner consistent with ever increasing disc speeds. It is also desirable that the motor be efficient both from an energy and volumetric standpoint so as to achieve high performance with reduced battery consumption and minimal dimensional footprint and weight. For the sake of reliability, it is further desirable that the motor be durable so as to survive heavy-duty cycle use over protracted operational periods.

FIG. 1 shows a prior art linear voice coil motor 20 with anisotropic magnets circumferentially divided into elongated arcuate segments 22. The elongated arcuate segments 22 are positioned between an outer yoke 24a and an inner yoke 24b (also referred to as a "center yoke" or a "center pole"). A voice coil assembly (not shown) includes a copper voice coil (not shown) attached to or supporting a coil housing or carriage (not shown). The voice coil assembly fits between the elongated arcuate magnet segments 22 and the outer surface of the inner yoke 24b. There is a mechanical cylindrical air gap on both sides of the voice coil and the coil housing that allows them to move in relation with the associated surfaces. It should be noted that the inner yoke, the outer yoke, or the voice coil and the coil housing can be the moving component.

Another prior art linear voice coil motor is described in U.S. Pat. No. 4,888.506 to Umehara et al. (the "Umehara reference"), the disclosure of which is incorporated herein by reference. The Umehara linear voice coil motor includes cylindrical outer and inner yokes with a single anisotropic permanent ring magnet (an anisotropic cylindrical ring magnet) affixed to the inner surface of the outer yoke. This anisotropic cylindrical ring magnet forms a cylindrical air gap with the inner yoke. The yokes are of ferromagnetic material and magnetically coupled so that the magnetic field emanating from the inner surface of the ring magnet radially crosses the cylindrical air gap, passes through the yokes, and returns to the magnet's outer surface. The voice coil (e.g. a copper voice coil) is supported by an insulative bobbin of hollow-core form (e.g. coil housing or carriage) that is mounted for slideable linear movement along the inner yoke so that when the coil is energized and interacts with the magnetic field in the cylindrical air gap, the voice coil assembly is driven back-and-forth depending on the current's direction.

Fabrication of anisotropic magnets (either the elongated arcuate segment version shown in FIG. 1 or the anisotropic cylindrical ring magnet discussed in the Umehara reference) begins with a milled powder, but anisotropic magnets are given their final shape by the application of high pressure and temperature while the material is being acted on by a strong magnetic field so that the particle grains align themselves uniformly to provide a strong field which is well-oriented directionally. Where, for example, the linear voice coil motor is used in the disc drive of a portable computer, the relatively stronger magnetic field produced by anisotropic magnets increases the maximum force and efficiency characteristics of the motor so as to facilitate, as described above, faster drive access, increased miniaturization, and decreased battery consumption. Preferred materials for the permanent magnet include various ferrites or, in particularly demanding environments, rare earth cobalt.

The steps noted above for fabricating these anisotropic magnets touch on the highlights of a fabrication process that, in practice, is much more complex. As shown in FIG. 2, an exemplary process necessary to create an anisotropic magnet may include steps such as milling 26a, molding 26b, profile grinding of the inner diameter 26c, profile grinding of the outer diameter 26d, adhering 26e, slicing 26f, dissolution 26g, surface grinding 26h, corner grinding 26i, pickling 26j, and plating 26k. Conventionally, the fabrication process starts with vacuum induction melting of a carefully optimized blend of alloyable ingredients to form an ingot. This ingot is coarsely ground, then further ground to intermediate grain size, and finally jet milled (milling 26a) to an even finer powder of critical grain size. Screening is used to remove undersized and oversized particles. The resulting highly reactive and combustible powder is stored under special conditions, such as in an argon gas atmosphere, while awaiting further processing. Based on chromatography results, a blend of different powders is combined and die pressed (molding 26b) into roughly the final shape desired while being acted on by a pulsed magnetic field to create a roughly shaped form. In the fabrication of anisotropic magnets, it is during the molding step that the particles are aligned. Introduced deformation stresses and density gradients may result in less than perfect grain alignment. Accordingly, after the pressing, the roughly shaped form is demagnetized and sintered in a high vacuum, whereupon further imperfections may arise if any portions of the roughly shaped form are permitted to enter a liquid phase. The rough form is then quenched and aged. At this stage in processing, dimensional measurements of the material are only approximate due to variations in shrinkage during pressing and sintering. For an anisotropic cylindrical ring magnet such as that shown in the Umehara reference, the inner and outer surfaces of the molded form are then roughly ground to the desired dimensions (profile grinding of the inner and outer diameters 26c, 26d). The form is adhered (adhering 26e) to a support and sliced (slicing 26f) into sections with a diamond saw. The adhesive is dissolved away (dissolution 26g) and the surfaces and corners of the annular ring magnet section are further ground (surface grinding 26h and corner grinding 26i) to the required tolerance. Finally the ring magnet is pickled (pickling 26j) and plated (plating 26k) to prevent chipping, crack formation, and oxidation buildup. These multiple steps require capital-intensive fabrication equipment and the retention of highly trained staff to manage and monitor the process.

FIGS. 3A and 3B show magnets suitable for use in a motor such as that shown in FIG. 1. Specifically, FIG. 3A shows elongated arcuate segments 22 of anisotropic material arranged to form an anisotropic ring magnet structure capable of being radially magnetized as indicated. FIG. 3B shows a single anisotropic cylindrical ring magnet 28 of anisotropic material (e.g. such as the device disclosed in the Umehara reference) capable of being radially magnetized as indicated. FIG. 3C shows the anisotropic cylindrical ring magnet 28 shown in FIG. 3B installed but before installation of the voice coil assembly, the figure showing post magnetization magnetic particle orientation. FIG. 3D shows the anisotropic cylindrical ring magnet 28 shown in FIG. 3B installed, but before installation of the voice coil assembly. FIG. 3D shows post magnetization flux, the radial magnetic field present in the cylindrical air gap produced by the radial magnetization of the anisotropic cylindrical ring magnet 28, and/or the general pattern of the magnetic field as it passes through the cylindrical yoke members 24a, 24b. FIG. 3E shows the magnetic force of the magnetic field in the cylindrical air gap, as indicated in FIG. 3D, as a function of linear displacement in an axial direction (toward axis z) in relation to the cylindrical yoke members 24a, 24b. As can be seen from FIG. 3E, the force constant between the cylindrical yoke members 24a, 24b is relatively level.

There are significant disadvantages associated with the use of anisotropic magnets. For example, the anisotropic magnets conventionally used in linear voice coil motors are relatively expensive to fabricate or purchase, particularly in applications where superior magnetic strength and directional uniformity are specified. Also, it is difficult to vary the process to optimize, for example, the dimensions of the magnets for different applications unless, for example, further capital outlays are made to purchase or lease specially dimensioned pressing and sintering equipment.

BRIEF SUMMARY OF THE INVENTION

Accordingly, an object of at least a preferred embodiment of the present invention is to provide a linear voice coil motor which overcomes at least certain of the disadvantages indicated above formerly associated with such motors, such as high component cost or fabrication expense, while offering performance comparable to that which is currently specified in relatively demanding applications, such as driving the read/write heads of portable computers.

The present invention is directed to a linear voice coil motor that includes an outer yoke and an inner yoke, the inner yoke magnetically coupled with and extending inside of the outer yoke. An air gap is defined between the outer yoke and the inner yoke. A voice coil assembly is mounted so as to enable movement between the voice coil assembly and at least one of the yokes. In one preferred embodiment, an isotropic magnet structure is positioned substantially between the outer yoke and the inner yoke, the isotropic magnet structure being coupled to either the outer yoke or the inner yoke. In another preferred embodiment, a magnet structure formed by a plurality of ring magnets is positioned substantially between the outer yoke and the inner yoke, the magnet structure being coupled to either the outer yoke or the inner yoke. In yet another preferred embodiment, an isotropic magnet structure formed by a plurality of ring magnets is positioned substantially between the outer yoke and the inner yoke, the isotropic magnet structure being coupled to either the outer yoke or the inner yoke. In embodiments with ring magnets, each ring magnet has a length to inner diameter ratio of less than 0.6 or more than 0.3.

The foregoing and other objectives, features, and advantages of the invention will be more readily understood upon consideration of the following detailed description of the invention, taken in conjunction with the accompanying drawings.

DETAILED DESCRIPTION OF THE INVENTION

The linear voice coil motor of the present invention, as will be described below, has two particularly unique features that may be used alone or together. First, preferred embodiments of the linear voice coil motor of the present invention use an isotropic magnet structure. Second, preferred embodiments of the linear voice coil motor of the present invention use a magnet structure formed by a plurality of ring magnets.

Figure 4:
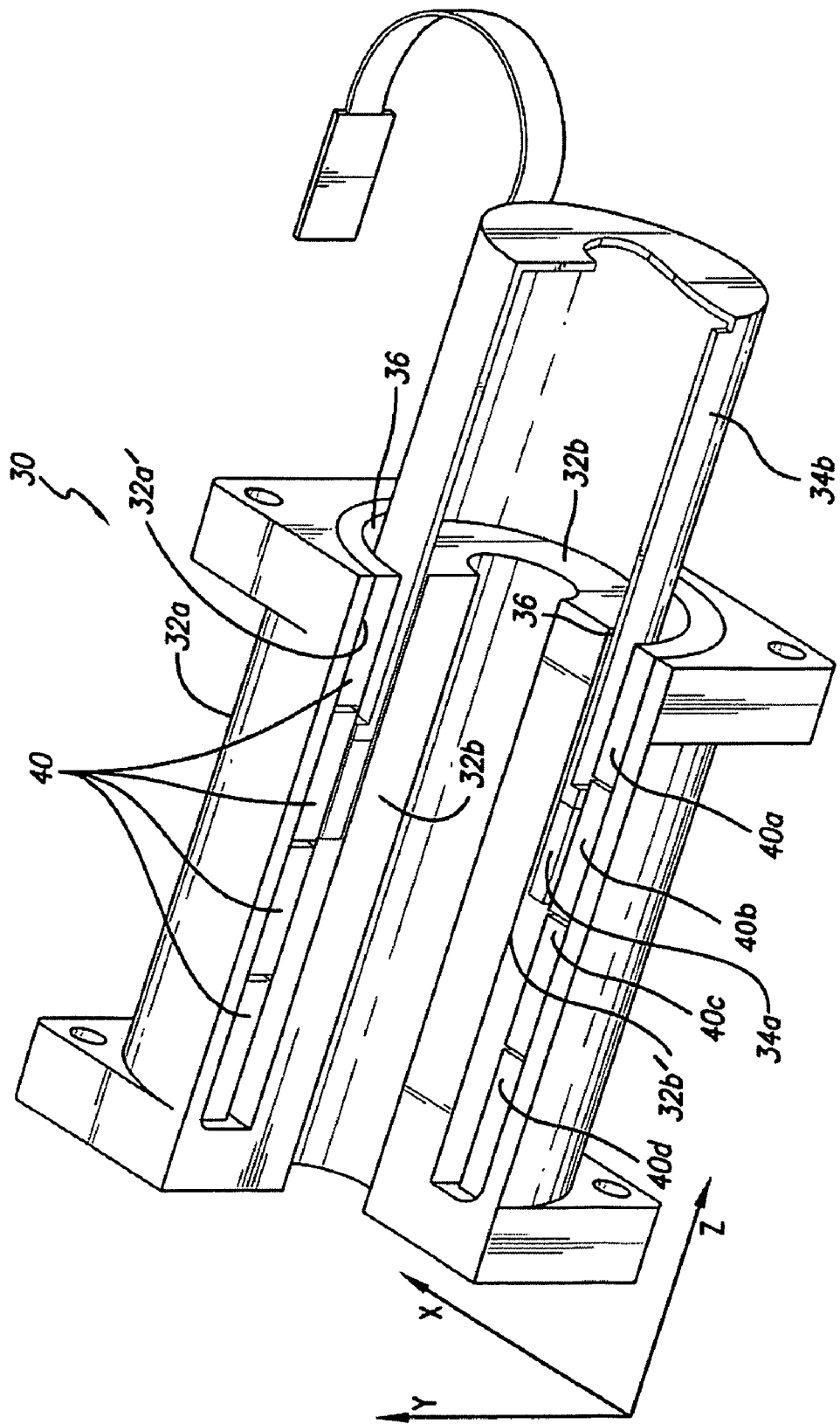
FIG. 4 is a cutaway perspective view of a linear voice coil motor with a plurality of ring magnets of isotropic material, the motor configured in accordance with an exemplary embodiment of the present invention.

FIG. 4 depicts an exemplary linear voice coil motor 30 constructed in accordance with a preferred exemplary embodiment of the present invention. The motor 30 includes a substantially cylindrical outer yoke 32a and a substantially cylindrical inner yoke 32b axially coincident with the outer yoke 32a. In the shown embodiment, the yoke structures 32a, 32b are interconnected (either as connected parts or as an integral structure) by backing member 32c (the horizontal portion (shown in FIG. 6C) between the relatively vertical yokes 32a, 32b). An isotropic magnet structure 40 is positioned between the inner surface 32a' of the outer yoke 32a (and shown as bonded thereto) and the inner yoke 32b. Alternatively, the isotropic magnet structure 40 could be bonded to the inner yoke 32b. A voice coil 34a (which may be made, for example, from copper) is positioned at an interior annular leg of a coil housing or carriage 34b. The voice coil 34a and the coil housing 34b (together referred to as a voice coil assembly) at least partially fit between the isotropic magnet structure 40 and the outer surface 32b' of the inner yoke 32b. There is a mechanical cylindrical air gap 36 on both sides of the voice coil 34a and the coil housing 34b that allows them to move in relation with the associated surfaces. When the voice coil 34a is energized and interacts with the magnetic field in the cylindrical air gap, the coil housing 34b is driven back-and-forth depending on the current's direction. Alternatively, either of the yoke structures 32a, 32b can be the moving component. Also, although shown as having linear movement, the movement may be rotary. The yoke structure 32a, 32b is preferably made, for example, from magnetically active (magnetic flux conductive/low reluctance) material (e.g. any soft magnetic material), such as one exhibiting ferromagnetic properties, so as to provide a mechanism for concentrating magnetic field strength particularly in the region of the magnetic cylindrical air gap defined between the yokes 32a, 32b. A linear voice coil motor such as that described in the Umehara reference, the disclosure of which is incorporated herein by reference, could also be used to implement the present invention.

The magnet structure 40 is of a unitary magnetic isotropic material and preferably has a circumferentially unitary construction. In a preferred exemplary embodiment such as that depicted in FIG. 4, the magnet structure 40 is comprised of a series of annular or ring magnets 40a, 40b, 40c, and 40d, disposed in an axially stacked relationship along the cylindrical inner surface 32a' of the outer yoke 32a. In preferred embodiments the ring magnets 40a-d are bonded together. These ring magnets 40a-d, in accordance with the present invention, are made of isotropic material, that is, the magnetic subdomains providing the magnetic effect represent, prior to processing, individual magnetic dipoles of random orientation generally pointing in every direction. In accordance with a preferred method of assembly, the ring magnets 40a-d may be magnetized (aligning particles) before attachment to the inner surface 32a' of the outer yoke 32a. The ring magnets 40a-d are magnetized so as to align their magnetic dipoles in a radial direction perpendicular to the inner yoke 32b.

Figure 1:
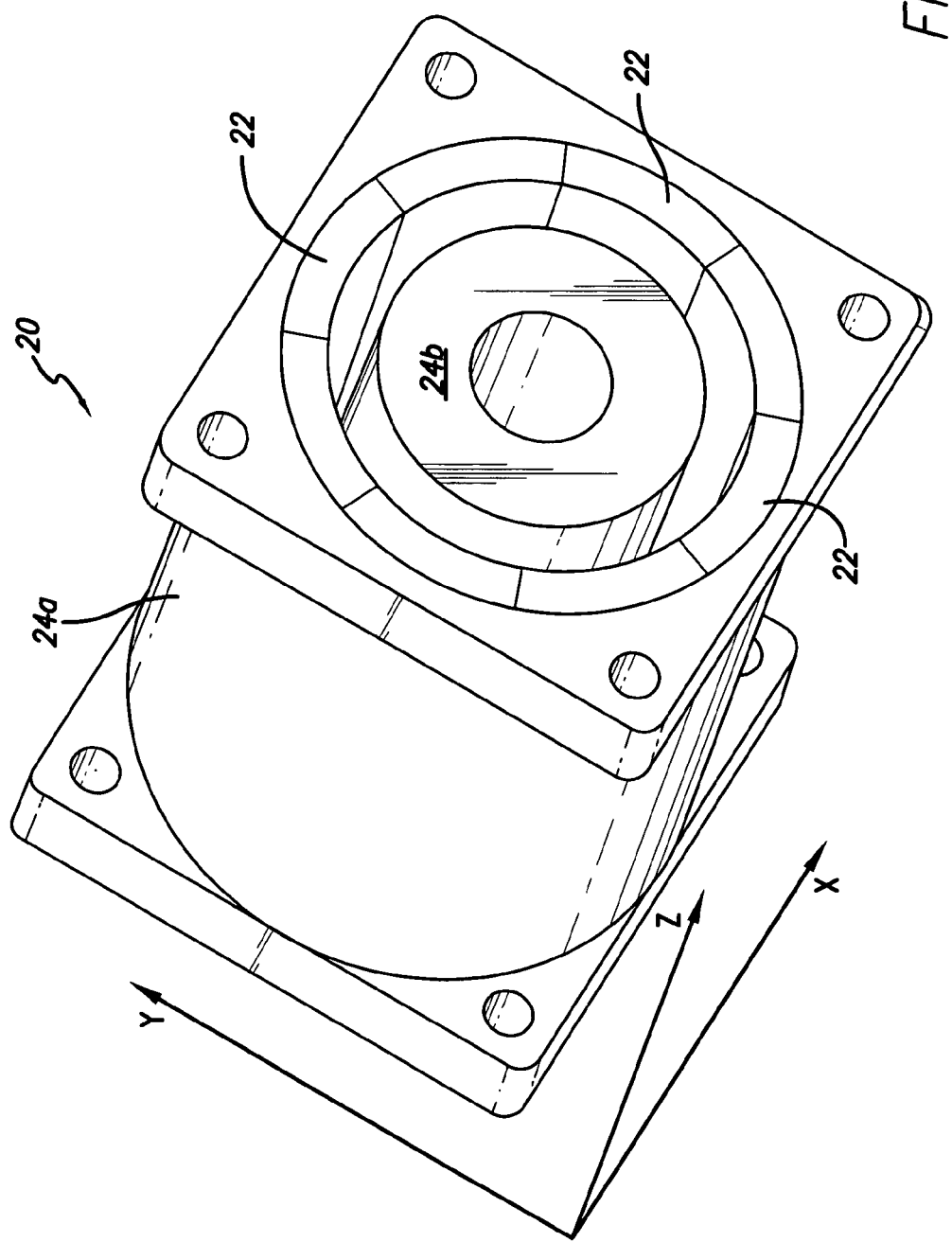
FIG. 1 is a perspective view of an exemplary prior art motor with anisotropic magnets circumferentially divided into elongated arcuate segments.

In choosing the type of permanent magnet used for linear voice coil motors, an overriding preference (if not the exclusive choice) is anisotropic magnets instead of, for example, isotropic. Use of isotropic magnets in voice coil linear motors has been considered impossible because the magnetic particles in isotropic magnets have a random orientation that would prevent the particles from being magnetized in any direction. In choosing the type of permanent magnet used for the linear voice coil motors, an overriding preference has been elongated arcuate segments (see FIG. 1). Although the Umehara reference discloses a linear voice coil motor that includes an anisotropic cylindrical ring magnet, the cost (based on time, labor, and/or money) of producing such a magnet is prohibitive. Further, producing anisotropic multiple ring magnets would be even more expensive.

The present invention specifically goes against conventional wisdom as well as industry standards, and uses magnets 40a-d (in preferred embodiments, a plurality of ring magnets) made from unitary magnetic isotropic material. Using isotropic magnets has many advantages over using anisotropic magnets including, but not limited to an easier fabrication process, much lower fabrication costs, and quicker fabrication times. Also, using isotropic magnets makes it possible to relatively easily vary the process to optimize, for example, the dimensions of the magnets for different applications without significant capital outlays to purchase or lease specially dimensioned pressing and sintering equipment.

Figure 2:
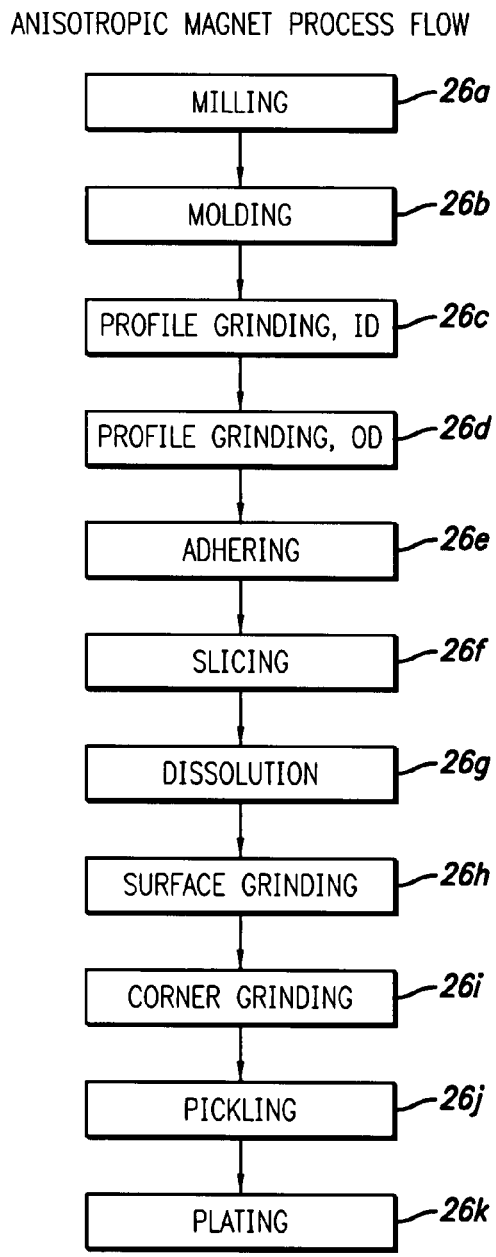
FIG. 2 is a flow chart showing exemplary steps conventionally involved in manufacturing an anisotropic cylindrical ring magnet.
Figure 5:
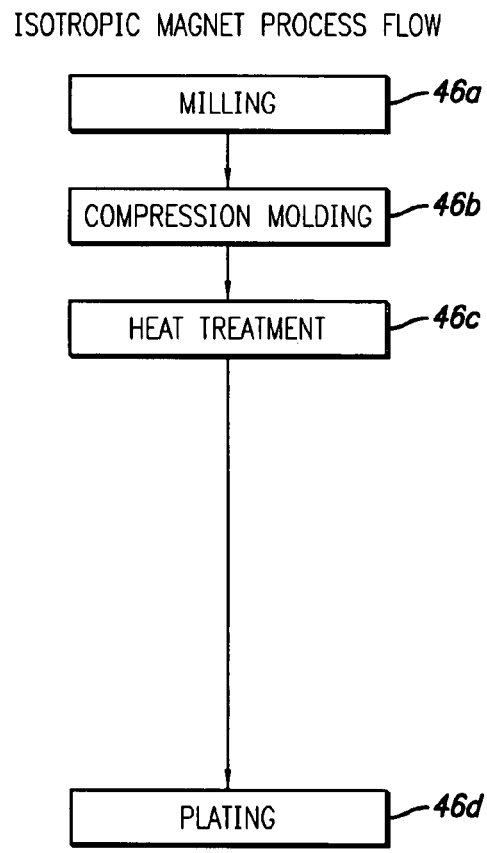
FIG. 5 is a flow chart showing. exemplary steps and exemplary sequence of steps for manufacturing ring magnets from isotropic material of the present invention.

Isotropic magnets typically are formed by milling magnetic material into a fine powder, and molding the material to its final shape while the resin is being temperature cured. The individual dipoles associated with the magnetic particles may be aligned by application of a strong magnetic field to flexibly produce elaborate field patterns, but the strength of this field is relatively weak and individual dipoles can vary to a degree from the desired directional alignment. As shown in FIG. 5, the present invention forms isotropic magnets using four primary fabrication steps: milling 46a ingot to a fine powder of critical grain size; compression molding 46b including (e.g. using a die press) the milled powder and a resin binder into an appropriate shape and size; heat treating 46c the compressed shaped form; and plating 46d the heat treated shaped form to prevent chipping, crack formation, and oxidation buildup. It should be noted that in the fabrication of isotropic magnets, particles are not aligned (magnetized) during the molding step. The four steps of FIG. 5 can be compared to the eleven steps shown in the process to create anisotropic magnets shown FIG. 2.

Figure 6D:
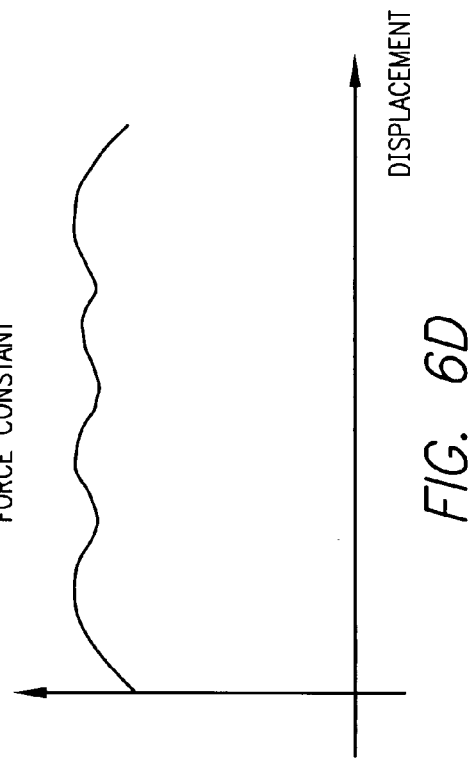
FIG. 6D is a graph showing the magnetic force of the magnetic field in the cylindrical air gap, as indicated in FIG. 6C, as a function of linear displacement in an axial direction in relation to the cylindrical yoke members.
Figure 6A:
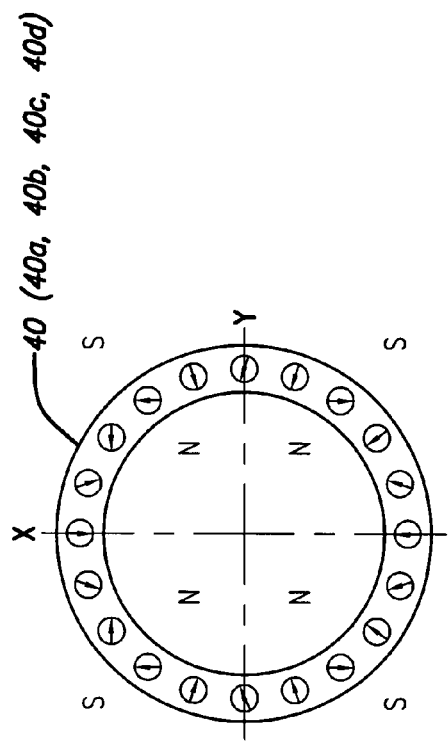
FIG. 6A is a cross sectional view taken on an x-y (horizontal) plane of a ring magnet of isotropic material capable of being radially magnetized as indicated, the isotropic ring magnet suitable for use in a motor such as that shown in FIG. 4.

FIG. 6A shows a ring magnet of isotropic material capable of being radially magnetized as indicated, the isotropic ring magnet 40 suitable for use in a motor 30 such as that shown in FIG. 4.

Figure 6C:
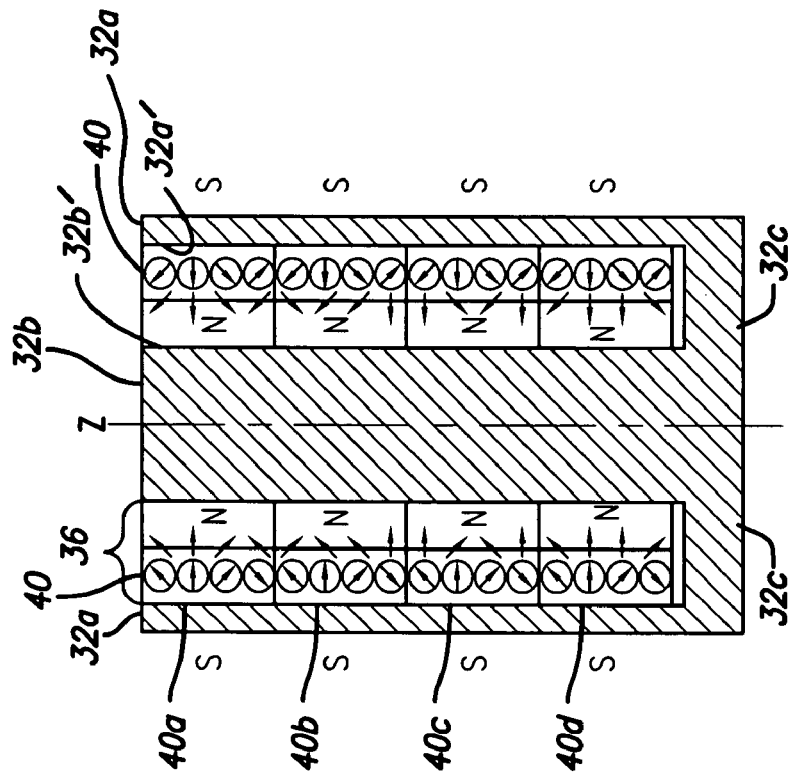
FIG. 6C is a longitudinal cross sectional view taken on a y-z (vertical) plane of a motor such as that shown in FIG. 4 with an axial series of the isotropic ring magnet shown in FIG. 6A installed but before installation of the voice coil housing or carriage, the figure showing post magnetization flux, the radial magnetic field present in the cylindrical air gap produced by the radial magnetization of the isotropic ring magnet(s), and/or the general pattern of the magnetic field as it passes through the cylindrical yoke members.
Figure 6B:
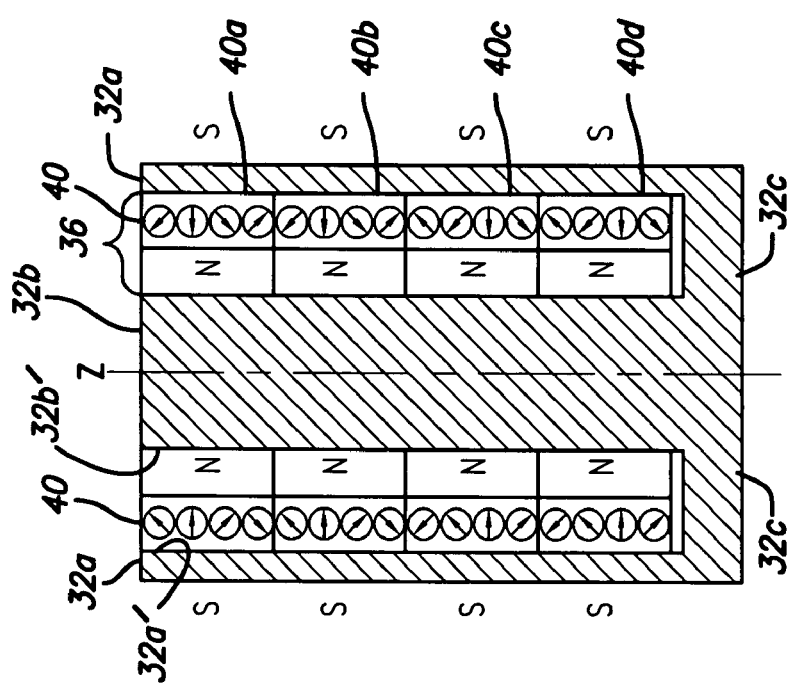
FIG. 6B is a longitudinal cross sectional view taken on a y-z (vertical) plane of a motor such as that shown in FIG. 4 with an axial series of the isotropic ring magnet shown in FIG. 6A installed but before installation of the voice coil housing or carriage, the figure showing post magnetization magnetic particle orientation.

FIG. 6B shows a motor 30 such as that shown in FIG. 4 with an axial series of the isotropic ring magnets 40 (isotropic ring magnets 40a-d) installed but before installation of the voice coil 34a or voice coil housing 34b, the figure showing post magnetization magnetic particle orientation.

FIG. 6C shows a motor 30 such as that shown in FIG. 4 with an axial series of the isotropic ring magnet 40 (isotropic ring magnets 40a-d) installed but before installation of the voice coil 34a or voice coil housing 34b, the figure showing post magnetization flux, the radial magnetic field present in the cylindrical air gap produced by the radial magnetization of the isotropic ring magnet(s) 40a-d, and/or the general pattern of the magnetic field as it passes through the cylindrical yoke members.

Figure 3A:
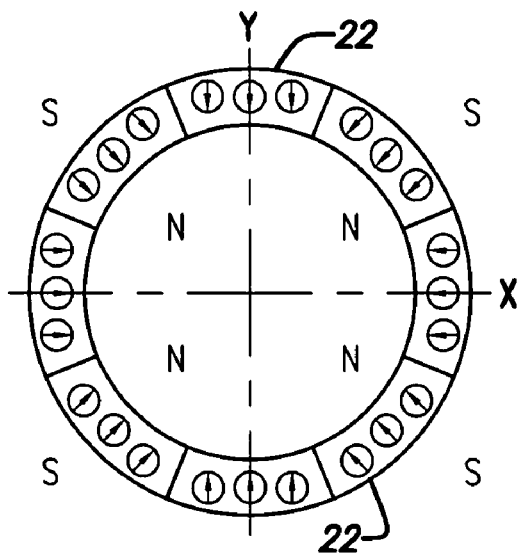
FIG. 3A is a cross sectional view taken on an x-y (horizontal) plane of elongated arcuate segments of anisotropic material arranged to form an anisotropic ring magnet structure capable of being radially magnetized as indicated, the anisotropic elongated arcuate segments suitable for use in a motor such as that shown in FIG. 1.
Figure 3B:
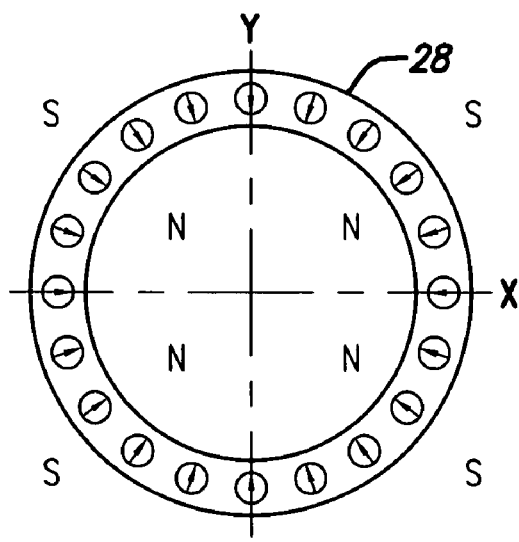
FIG. 3B is a cross sectional view taken on an x-y (horizontal) plane of a single anisotropic cylindrical ring magnet capable of being radially magnetized as indicated, the anisotropic cylindrical ring magnet suitable for use in a motor such as that shown in FIG. 1.
Figure 3C:
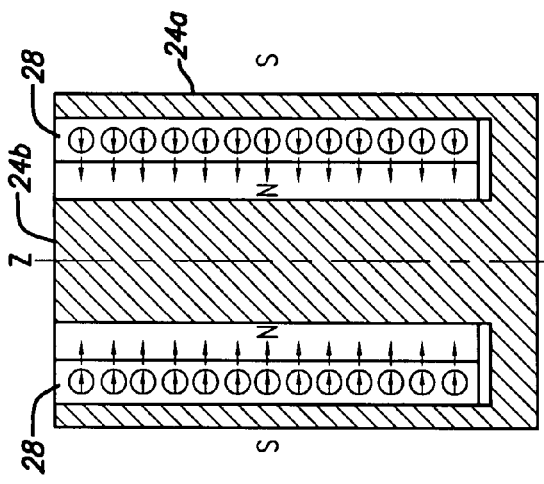
FIG. 3C is a longitudinal cross sectional view taken on a y-z (vertical) plane of a motor such as that shown in FIG. 1 with the single anisotropic cylindrical ring magnet shown in FIG. 3B installed but before installation of the voice coil housing or carriage, the figure showing post magnetization magnetic particle orientation.
Figure 3D:
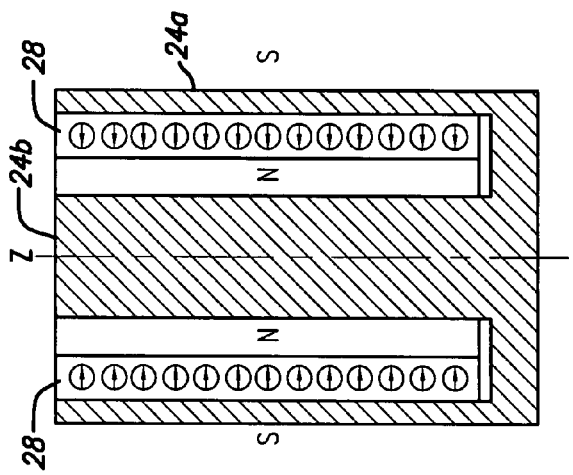
FIG. 3D is a longitudinal cross sectional view taken on a y-z (vertical) plane of a motor such as that shown in FIG. 1 with the single anisotropic cylindrical ring magnet shown in FIG. 3B installed but before installation of the voice coil housing or carriage, the figure showing post magnetization flux, the radial magnetic field present in the cylindrical air gap produced by the radial magnetization of the anisotropic cylindrical ring magnet, and/or the general pattern of the magnetic field as it passes through the cylindrical yoke members.
Figure 3E:
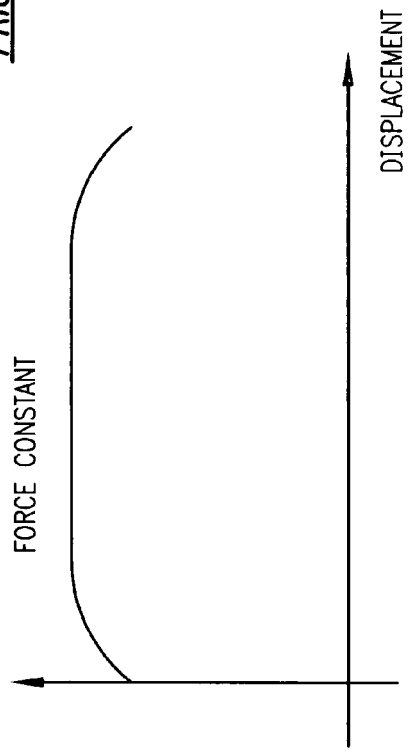
FIG. 3E is a graph showing the magnetic force of the magnetic field in the cylindrical air gap, as indicated in FIG. 3D, as a function of linear displacement in an axial direction in relation to the cylindrical yoke members.

FIG. 6D shows the magnetic force of the magnetic field in the magnetic cylindrical air gap 36, as indicated in FIG. 6C, as a function of linear displacement in an axial direction (along the z axis) in relation to the cylindrical yoke members 32a, 32b. The magnetic force shown in FIG. 6D can be compared to the magnetic force shown in FIG. 3E. Specifically, the force constant shown in FIG. 3E between the cylindrical vbke members 24a, 24b is relatively level whereas the force constant shown in FIG. 6D between the cylindrical yoke members 32a, 32b is not "monotonic." The use of an isotropic magnet trades off performance (e.g. a level force constant/nonlinearity) for the advantages of isotropic ring magnets 40. Use of the isotropic ring magnets 40 will degrade performance, but experimental use has shown that the isotropic ring magnets 40, in practice, actually approach the anisotropic magnet in performance because, although producing a less uniform field, isotropic ring magnets 40 can be molded to precisely defined tolerances if sufficient care is taken during fabrication. It is a standard industry belief that the force constant should be monotonic and, if it is not monotonic the motor will be difficult to control.

It should be noted that the isotropic magnet structure 40 shown uses isotropic ring magnets 40a-b of equal length. This however, is only a preferred embodiment. For example, for a 36 mm (1.417 inches) motor 30, the followihg exemplary configurations could be acceptable, depending on the materials used, the fabrication process, the magnetization process, and the intended use.

A series of four isotropic ring magnets, each being 9 mm (0.3543 inch) in length.

A series of six isotropic ring magnets, each being 6 mm (0.2362 inch) in length.

A series of four isotropic ring magnets, three being 10 mm (0.3937 inch) in length and one being 6 mm (0.2362 inch) in length.

A series of three isotropic ring magnets, two being 15 mm (0.5906 inch) in length and one being 6 mm (0.2362 inch) in length.

Preferred embodiments, based on experimentation and testing, follow the following algorithm that shows the characteristics isotropic magnets preferably have to work in a voice coil linear motor: the length to inner diameter ratio of a ring magnet is in the range of approximately 0.3 to 0.6. If a longer stroke is needed, more ring magnets are needed. For example, if the length to inner diameter ratio is greater than 0.4, multiple ring segments enable the magnetization of the isotropic magnets before assembly and, therefore, the construction of the long aspect ratio voice motor is possible. Similarly, if a shorter stroke is needed, fewer ring magnets are needed.

Figure 8:
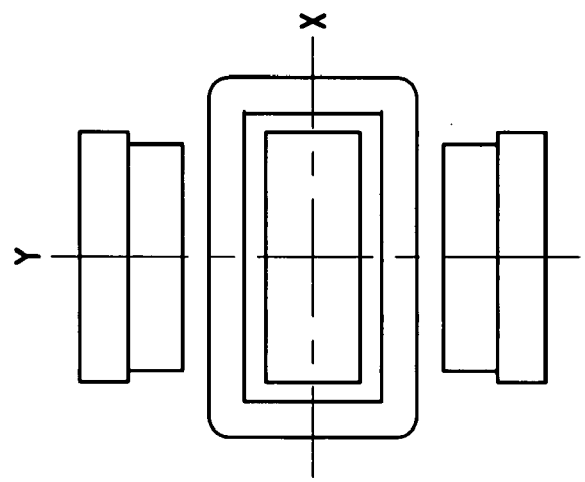
FIG. 8 is a cross sectional view of the alternative linear voice coil motor of FIG. 7 along line 8-8' of FIG. 7.
Figure 7:
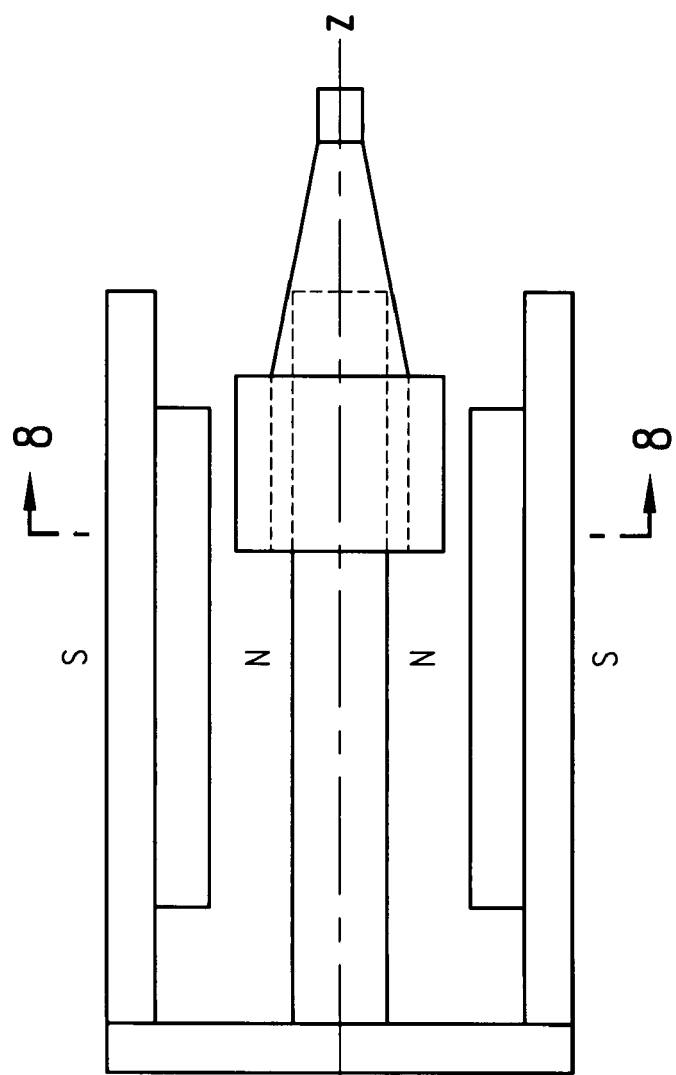
FIG. 7 is a cross sectional view of an alternative linear voice coil motor with a plurality of ring magnets of isotropic material taken along a longitudinal axis.

FIGS. 7 and 8 show an alternative linear voice coil motor with at least one bar magnet made from isotropic material. Significantly, the alternative linear voice coil motor is not symmetrical (it is rectangular). However, experimental use has shown that the present invention will function properly in this motor.

Other motors with which the present invention may be used include, but are not limited to those disclosed in U.S. Pat. No. 4,414,594, U.S. Pat. No. 4,462,054, and U.S. Pat. No. 4,415,941. The disclosures of these references are herein incorporated by reference.

It should be noted that some terms used in this specification are meant to be relative. For example, the terms "horizontal plane" (x-y plane) and "vertical plane" (y-z plane) are meant to be relative and, if the device was rotated, the terms would change accordingly.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A linear voice coil motor comprising:
   (a) an outer yoke;
   (b) an inner yoke magnetically coupled with and extending inside of said outer yoke;
   (c) an air gap defined between said outer yoke and said inner yoke;
   (d) a radially magnetized isotropic magnet structure positioned substantially between said outer yoke and said inner yoke, said isotropic magnet structure coupled to at least one of said outer yoke and said inner yoke; and
   (e) a voice coil assembly mounted so as to enable movement between said voice coil assembly and at least one of said yokes.

2. The motor of claim 1 wherein said outer yoke is of soft magnetic material and said inner yoke is of soft magnetic material.

3. The motor of claim 1 wherein said outer yoke is substantially cylindrical and said inner yoke is substantially cylindrical, said air gap being a substantially cylindrical magnetic air gap defined between said outer yoke and said inner yoke.

4. The motor of claim 1 wherein said isotropic magnet structure is formed by at least one ring magnet of circumferentially unitary construction.

5. The motor of claim 1 wherein said isotropic magnet structure is formed by a plurality of ring magnets, each ring magnet having a length to inner diameter ratio of less than 0.6.

6. The motor of claim 1 wherein said isotropic magnet structure is formed by a plurality of ring magnets, each ring magnet having a length to inner diameter ratio of more than 0.3.

7. The motor of claim 1, said voice coil assembly mounted so as to enable linear back-and-forth movement between said voice coil assembly and at least one of said yokes.

8. The motor of claim 1 wherein stroke length is proportional to said isotropic magnet structure.

9. The motor of claim 1 wherein said motor is a single coil linear voice coil motor.

10. A linear voice coil motor comprising:
   (a) an outer yoke;
   (b) an inner yoke magnetically coupled with and extending inside of said outer yoke;
   (c) an air gap defined between said outer yoke and said inner yoke;
   (d) a magnet structure formed by a plurality of radially magnetized ring magnets, said magnet structure positioned substantially between said outer yoke and said inner yoke, said magnet structure coupled to at least one of said outer yoke and said inner yoke; and
   (e) a voice coil assembly mounted so as to enable movement between said voice coil assembly and at least one of said yokes.

11. The motor of claim 10 wherein said outer yoke is of soft magnetic material and said inner yoke is of soft magnetic material.

12. The motor of claim 10 wherein said outer yoke is substantially cylindrical and said inner yoke is substantially cylindrical, said air gap being a substantially cylindrical magnetic air gap defined between said outer yoke and said inner yoke.

13. The motor of claim 10, each ring magnet having a length to inner diameter ratio of less than 0.6.

14. The motor of claim 10, each ring magnet having a length to inner diameter ratio of more than 0.3.

15. The motor of claim 10 wherein stroke length is proportional to said magnet structure.

16. The motor of claim 10 wherein said motor is a single coil linear voice coil motor.

17. A linear voice coil motor comprising:
   (a) an outer yoke;
   (b) an inner yoke magnetically coupled with and extending inside of said outer yoke;
   (c) an air gap defined between said outer yoke and said inner yoke;
   (d) a radially magnetized isotropic magnet structure formed by a plurality of ring magnets, said isotropic magnet structure positioned substantially between said outer yoke and said inner yoke, said isotropic magnet structure coupled to at least one of said outer yoke and said inner yoke; and
   (e) a voice coil assembly mounted so as to enable movement between said voice coil assembly and at least one of said yokes.

18. The motor of claim 17 wherein said outer yoke is of soft magnetic material and said inner yoke is of soft magnetic material.

19. The motor of claim 17 wherein said outer yoke is substantially cylindrical and said inner yoke is substantially cylindrical, said air gap being a substantially cylindrical magnetic air gap defined between said outer yoke and said inner yoke.

20. The motor of claim 17 wherein each ring magnet of said plurality of ring magnets is of circumferentially unitary construction.

21. The motor of claim 17, each ring magnet having a length to inner diameter ratio of less than 0.6.

22. The motor of claim 17, each ring magnet having a length to inner diameter ratio of more than 0.3.

23. The motor of claim 17 wherein stroke length is proportional to said isotropic magnet structure.

24. The motor of claim 17 wherein said motor is a single coil linear voice coil motor.

* * * * *